US012621613B2

(12) United States Patent
Kuenzle et al.

(10) Patent No.: US 12,621,613 B2
(45) Date of Patent: May 5, 2026

(54) METHOD OF DETECTING A SUDDEN CHANGE IN A FEEDBACK/ECHO PATH OF A HEARING AID

(71) Applicant: Oticon A/S, Smørum (DK)

(72) Inventors: Bernhard Kuenzle, Düdingen (CH); Martin Kuriger, Fribourg (CH); Meng Guo, Smørum (DK)

(73) Assignee: Oticon A/S, Smørum (DK)

( * ) Notice: Subject to any disclaimer, the term of this patent is extended or adjusted under 35 U.S.C. 154(b) by 94 days.

(21) Appl. No.: 18/303,052

(22) Filed: Apr. 19, 2023

(65) Prior Publication Data

US 2023/0254649 A1 Aug. 10, 2023

Related U.S. Application Data

(62) Division of application No. 17/560,611, filed on Dec. 23, 2021, now Pat. No. 11,671,767.

(30) Foreign Application Priority Data

Dec. 28, 2020 (EP) .................................... 20217344
Feb. 15, 2021 (EP) .................................... 21157068

(51) Int. Cl.
*H04R 3/02* (2006.01)
*H04R 25/00* (2006.01)

(52) U.S. Cl.
CPC ............. *H04R 25/453* (2013.01); *H04R 3/02* (2013.01); *H04R 25/505* (2013.01); *H04R 2225/43* (2013.01); *H04R 2430/03* (2013.01)

(58) Field of Classification Search
CPC ...... H04R 25/453; H04R 25/505; H04R 3/02; H04R 2225/43; H04R 2430/03
See application file for complete search history.

(56) References Cited

U.S. PATENT DOCUMENTS

| | | | | |
|---|---|---|---|---|
| 10,950,213 | B1 | 3/2021 | Goodix | |
| 11,277,685 | B1 | 3/2022 | Amazon | |
| 11,849,283 | B2 * | 12/2023 | Garudadri | H04R 25/453 |
| 2010/0202641 | A1 | 8/2010 | Guo | |
| 2013/0156208 | A1 * | 6/2013 | Banba | H04R 25/407 381/60 |
| 2016/0037269 | A1 | 2/2016 | Pte | |
| 2019/0373379 | A1 | 12/2019 | Pte | |
| 2022/0360911 | A1 | 11/2022 | Californ | |

FOREIGN PATENT DOCUMENTS

| | | | |
|---|---|---|---|
| EP | 2 217 007 | A1 | 8/2010 |
| EP | 3 291 581 | A2 | 3/2018 |
| EP | 3 481 085 | A1 | 5/2019 |
| WO | WO99/12388 | A1 | 3/1999 |

* cited by examiner

*Primary Examiner* — Suhan Ni
(74) *Attorney, Agent, or Firm* — Birch, Stewart, Kolasch & Birch, LLP

(57) ABSTRACT

A method of detecting a sudden change in a feedback/echo path of a hearing aid is based on a gradient of an adaptive filter comprising an adaptive algorithm configured to estimate the feedback/echo path. The method may comprise comparing a smoothed and processed version of the gradient values over time to a threshold value. A hearing aid configured to detect a sudden change in a feedback/echo path is furthermore provided.

15 Claims, 8 Drawing Sheets

METHOD OF DETECTING A SUDDEN CHANGE IN A FEEDBACK/ECHO PATH OF A HEARING AID

This application is a Divisional of copending application Ser. No. 17/560,611, filed on Dec. 23, 2021, which claims priority under 35 U.S.C. § 119(a) to Application No. 20217344.9, filed in Europe on Dec. 28, 2020, and Application No. 21157068.4, filed in Europe on Feb. 15, 2021, all of which are hereby expressly incorporated by reference into the present application.

BACKGROUND

The background of the present disclosure is in the technical area of adaptive filter control, more specifically in feedback and/or echo path change and detection, e.g. in hearing aids or headsets. Traditional adaptive filters used for feedback cancellation have a trade-off between convergence/tracking and steady-state errors. It means that many times the convergence/tracking of the adaptive filters needs to be compromised to obtain reasonable steady-state errors. This limits how fast an adaptive filter can cancel feedback upon a change of feedback situation, e.g., when the user wearing a hearing aid gets too close to a hard surface.

SUMMARY

The present disclosure proposes a method/procedure to speed up the adaptive filter convergence/tracking upon critical changes of feedback situations, without sacrificing goal of obtaining reasonable steady-state errors.

The present disclosure further describes a simple method to rapidly detect a feedback/echo path change, which would require a reaction from a feedback/echo cancellation systems, e.g. in that the adaptive filters in these systems need to adapt to the new feedback/echo paths upon the changes. These rapid detections can be used to change programs, e.g. different applications of gain/directionality, etc., in an audio system.

A Hearing Aid:

In a general aspect, a hearing aid with an improved feedback control system is provided (see e.g. FIG. 1A). The hearing aid comprises a forward path for processing an audio signal. The forward path may e.g. comprise A) an input transducer configured to convert sound in an environment of the user to an electric input signal representing the sound, B) a processor for processing said electric input signal, or a signal derived therefrom (e.g. a feedback corrected signal), and for providing a processed signal, and C) an output transducer for converting the processed signal, or a signal derived therefrom, to stimuli perceivable by the user as sound. The forward path may e.g. provide a forward path transfer function (F, e.g. F(k,n), where k and n are frequency and time indices, respectively). The forward path transfer function (F) may e.g. be configured to compensate for a hearing impairment of a user of the hearing aid. The hearing aid may e.g. further comprise D) a feedback control system for handling external feedback from the output transducer to the input transducer. The feedback control system may e.g. comprise E) an adaptive filter comprising an adaptive algorithm. The adaptive filter may e.g. be configured to provide a current estimate of a feedback signal from the output transducer to the input transducer. The feedback control system may e.g. further comprise F) a combination unit configured to subtract the current estimate of the feedback signal from the electric input signal, or a processed version thereof, and to provide a feedback corrected signal, termed the error signal. The processor may e.g. be configured to base its processing on the error signal. The feedback control system may e.g. further comprise G) a feedback change estimator configured to provide an (instant or fast) estimate of a feedback path transfer function (or a sudden change thereof) in dependence of the forward path transfer function, and optionally a current estimate of the feedback path transfer function provided by the adaptive algorithm. The feedback control system may e.g. further comprise H) an adaptive filter controller for providing an update transfer function estimate for the adaptive filter in dependence of the (instant or fast) estimate of the feedback path transfer function. The (instant or fast) estimate of the feedback path transfer function is e.g. intended to be provided from one time index (n) to the next (n+1) (as opposed to the current estimate of the feedback path transfer function provided by the (adaptive algorithm of the) adaptive filter. The feedback control system may comprise a feedback instability detector for monitoring the fulfillment of a feedback path instability criterion (e.g. indicating a sudden change or instability of the feedback path transfer function). In case the feedback path instability criterion is fulfilled, the (instant or fast) estimate of the feedback path transfer function is intended to override the current estimate of the feedback path transfer function provided by the adaptive filter (the adaptive algorithm) to thereby provide a faster convergence of the adaptive algorithm. It is the intention that the adaptive algorithm continues its feedback path estimation using the (instant or fast) estimate of the feedback path transfer function and to let the adaptive algorithm continue its adaptation from there.

In an aspect of the present application, a hearing aid configured to be worn by a user is provided. The hearing aid comprises a forward path comprising

- an input transducer configured to convert sound in an environment of the user to an electric input signal representing said sound,
- a processor for processing said electric input signal or a signal derived therefrom and for providing a processed signal;
- an output transducer for converting said processed signal to stimuli perceivable by the user as sound;
- the forward path providing a forward path transfer function F(k,n), where k and n are frequency and time indices, respectively,
  - a feedback control system for handling external feedback from the output transducer to the input transducer, the feedback control system comprising
  - an open loop gain estimator for providing an (instant or fast) open loop gain estimate;
  - an adaptive filter comprising an adaptive algorithm, the adaptive filter being configured to provide a current estimate of a feedback signal;
  - a combination unit configured to subtract said current estimate of the feedback path signal from said electric input signal, or a processed version thereof, and to provide a feedback corrected signal, termed the error signal,
  - a feedback change estimator configured to provide an (instant or fast) estimate of a feedback path transfer function (or a change in the feedback transfer function) in dependence of said forward path transfer function F(k,n), said (instant or fast) open loop gain estimate, and optionally a current estimate of the feedback path transfer function, and
  - an adaptive filter controller for providing an update transfer function estimate for said adaptive filter in dependence of said (instant or fast) estimate of the feedback path transfer function.

Thereby a hearing aid comprising an improved feedback control may be provided.

The term ‘instant <parameter> estimate’ (or ‘instant estimate of <parameter>’) is in the present context be taken to indicate the <parameter> is ‘instantaneously estimated’, e.g. as opposed to a value that is provided by an adaptive algorithm (which generally cannot adapt ‘instantaneously’ to sudden changes, but may be lacking behind in the order of hundreds of milliseconds, followed by the convergence of the adaptive algorithm). The term ‘instant <parameter> estimate’ (or ‘instant estimate of <parameter>’) may in the present context be taken to indicate that estimate is not lagging behind (the physical value) in time. The term ‘instantaneously’ may in the present context be taken to relate to a unit of the time index (n) of the hearing aid, and to indicate that the <parameter> is estimated in a matter of one, or a few, time units (e.g. between 1 and 20, such as between 1 and 10), cf. e.g. FIG. 4. The term ‘instantaneously’ may relate to the duration of a ‘time frame’ or ‘a loop delay’ of the hearing aid. A time unit may depend on a sampling rate of the electric input signal, a number of samples per time frame, and on a degree of overlap of time frames. A time frame may e.g. have a duration of the order of milliseconds. A (round-trip) loop delay of the hearing aid may e.g. have a duration of the order of ten milliseconds (cf. e.g. FIG. 3).

The ‘instant’ feedback path transfer function $H_{post}$, or the instant estimate $\hat{H}_{post}$ of the feedback path transfer function, is e.g. the feedback path transfer function, or the estimate of the feedback path transfer function, after a sudden change of the ‘current’ (i.e. currently present) feedback path, e.g. when a user takes a telephone to the ear.

Instead of the term ‘instant <parameter> estimate’ (or ‘instant estimate of <parameter>’), the term ‘fast <parameter> estimate’ (or ‘fast estimate of <parameter>’) may be used, where <parameter> may be ‘open loop gain’ or ‘feedback path transfer function’. For example, instead of the term ‘instant open loop gain estimate’, the term ‘fast open loop gain estimate’ ($\hat{L}_{fast}(k, n)$) may be used. Likewise, instead of the term ‘instant estimate ($H_{post}(k,n)$) of the feedback path transfer function’, the term ‘fast estimate ($\hat{H}_{post}(k,n)$) of the feedback path transfer function’ may be used.

Likewise, instead of the term ‘instant <parameter> estimate’ (or ‘instant estimate of <parameter>’), the term ‘first <parameter> estimate’ (or ‘first estimate of <parameter>’) may be used, where <parameter> may be ‘open loop gain’ or ‘feedback path transfer function’. For example, instead of the term ‘instant open loop gain estimate’, the term ‘first open loop gain estimate’ ($\hat{L}_{fast}(k, n)$) may be used. Likewise, instead of the term ‘instant estimate ($\hat{H}_{post}(k,n)$) of the feedback path transfer function’, the term ‘first estimate ($\hat{H}_{post}(k,n)$) of the feedback path transfer function’ may be used.

The update transfer function estimate ($H'_{post}(k, n)$) may be used in the adaptive filter to update, e.g. override, the current estimate ($\hat{H}_{pre}(k, n)$) of the feedback path transfer function.

The update transfer function estimate ($\hat{H}'_{post}(k, n)$) may be equal to the instant estimate ($\hat{H}_{post}(k,n)$) of the feedback path transfer function.

The feedback change estimator (FCE) is configured to provide the update transfer function estimate ($\hat{H}'_{post}(k, n)$) as a linear combination of said instant open loop gain estimate ($\hat{L}_{fast}(k, n)$) divided by said forward path transfer function ($F(k,n)$) (H1) and said current estimate ($\hat{H}_{pre}(k, n)$) of the feedback path transfer function (H2). In other words, $\hat{H}'_{post}(k,n)=\alpha\#H1+\beta\cdot H2$, where α and β are weights. The weights α and β may e.g. be real numbers in the range between 0 and 1. The weights α and β may e.g. be subject to the constraint that their sum is 1 (i.e. $\alpha+\beta=1$). The weights α and β may e.g., in a first extreme case after a sudden change, assume the values $\alpha=1$ and $\beta=0$. The weights α and β may e.g., in a second extreme case in a stable situation of the feedback path, assume the values $\alpha=0$ and $\beta=1$.

The open loop gain estimator (OLGE) may be configured to provide said instant open loop gain estimate as $\hat{L}_{fast}(k, n)=E(k, n)/E(k, n-D)$, where $E(k,n)$ is the error signal at time instance n and $E(k,n-D)$ is the error signal one loop delay D, or an estimate thereof, earlier, and where the loop delay D represents a roundtrip delay of the audio path of the hearing aid. The roundtrip delay of the hearing aid may comprise the delay (d) of the forward (audio) path of the hearing aid (from the acoustic input of the input transducer to the acoustic (or vibrational) output of the output transducer as well as the delay (d') of an acoustic (or mechanical) feedback delay path from output to input transducer. The loop delay may be approximated by the delay (d) of the forward (audio) path of the hearing aid.

The adaptive algorithm may comprise an LMS, or an NLMS algorithm. The current estimate of the feedback path transfer function (e.g. provided by an algorithm part of the adaptive filter) may be based on the adaptive algorithm, e.g. an LMS, or an NLMS algorithm.

The adaptive algorithm may comprise an NLMS algorithm, and a residual feedback path transfer function may be estimated by the NLMS algorithm, the estimate ($\hat{H}_{res}$) of the residual feedback path transfer function may be defined as the difference between the estimate ($\hat{H}_{post}$) of the feedback path transfer function after a sudden change of the feedback path and the estimate of the feedback path transfer function before the sudden change occurred, the latter being given by the current feedback path estimate ($\hat{H}_{pre}$) provided by the adaptive algorithm. In short, $\hat{H}_{res.}=\hat{H}_{post}-\hat{H}_{pre}$.

The hearing aid may comprise one or more analysis filter banks allowing one or more signals of the hearing aid to be processed in a time-frequency domain. The time-frequency domain may also be termed ‘the frequency domain’. It indicates that the signal in question is split into a number of individual signals (frequency sub-band signals), each representing a separate (different, but possibly overlapping) part of the operating frequency range of the hearing aid. The analysis filter bank may e.g. be implemented as a Fourie transformation of the (time-domain) input signal, e.g. a discrete Fourier transform (DFT), such as a short time Fourier transform (STFT). The hearing aid may comprise one or more synthesis filter banks, each being configured to convert a time-frequency domain signal to a time-domain signal.

The hearing aid may comprise a feedback instability detector for monitoring the fulfillment of a feedback path instability criterion. The feedback instability detector may e.g. be configured to identify a sudden change or instability of the feedback path transfer function, and to provide a feedback instability control signal in dependence thereof (e.g. indicating whether or not, or to what extent, the feedback path instability criterion is fulfilled). The feedback instability detector may e.g. form part of or be connected to the feedback change estimator (FCE). In case the feedback path instability criterion is fulfilled, the feedback change estimator (FCE) is configured to provide the instant estimate ($\hat{H}_{post}(k,n)$) of the feedback path transfer function to the adaptive filter controller (AFC). The adaptive filter controller may be configured to only provide the update transfer function estimate ($\hat{H}'_{post}(k, n)$) to the adaptive filter in case the feedback path instability criterion is fulfilled.

A simple (general) method for detecting changing situations of feedback/echo paths of an audio device (e.g a hearing aid or a headset) earlier than the adaptive filter would be able to adapt to the new acoustic situations is proposed in the following.

The gradient of the adaptive filter adaptation for feedback/echo cancellation itself reveals a lot of the acoustic situation, much before the adaptive filter can compensate for the acoustic feedback/echo path changes.

A simple method of detecting fast feedback/echo path change detection based on the gradient is proposed. The basic idea is to compare a smoothed (filtered) and processed version of the gradient values over time to a threshold value. The motivation for this idea is the following. When there is no feedback/echo path change the (smoothed) gradient values would be close to zero. When, on the other hand, there is a feedback/echo path change, the gradient values would be very different than zero (and it would follow a trajectory from the current estimate to the new feedback/echo path, see e.g. FIG. 4).

A method of detecting a sudden change in a feedback/echo path may comprise

1. Estimating a feedback path using an adaptive algorithm;
2. Smoothing a gradient of the adaptive algorithm over time:
3. Performing an operation on the smoothed gradient to provide a modified gradient;
4. Determining whether the gradient, or the smoothed or modified gradient, fulfils an instability criterion.

When the instability criterion is fulfilled, a detection of a sudden change in the feedback- or echo-path may be declared.

The method may further comprise that when the instability criterion is not fulfilled, repeat steps 1-4.

The method may further comprise that when the instability criterion is fulfilled determine a feedback path change from the gradient, or the smoothed or modified gradient.

The method may further—in case the instability criterion is fulfilled—comprise updating the adaptive feedback path estimate of the adaptive algorithm (e.g. in dependence of the determined feedback path change), and/or adapting other processing of the device (e.g. directionality), The method may provide that the instability criterion is fulfilled when the one or more gradient values (or smoothed or modified gradient values) or a weighted combination of said one or more gradient values (or smoothed or modified gradient values) are or is larger than a threshold value.

According to the present disclosure, a method of detecting a sudden change in a feedback path of a hearing device may comprise 1. Smoothing the gradient vector g(n) of the adaptive filter coefficients over time (where, n is the time index), e.g. by using a first-order filter with the coefficient a (where a is a small and positive number), $$g_{sm}(n)=a*g(n)+(1-a)*g_{sm}(n-1)$$

The elements of the gradient vector g(n) are constituted by the gradients to adapt the respective filter coefficients of the adaptive filter from one iteration to the next (from one time step to the next).

2. Performing operations (O) on the vector entries of the smoothed gradient vector $g_{sm}(n)$, e.g.

$$g_O(n)=O(g_{sm}(n))$$

wherein the operations (O) may be or include min, max, median, sum, mean, abs, etc.

3. Performing comparison of the operations vector (could be a full vector or a single value depends on the operations (O)) with a feedback criterion, e.g. a threshold value (THV) to determine the feedback/echo path change, e.g.

$$g_O(n)>\text{THV?}$$

The threshold value may be a single value, or a threshold vector. In case of a vector it may contain the same threshold values for all elements of the gradient vector also $g_O$. It may however be different for (at least some of the elements of the gradient vector) and hence be expressed as a vector (THV) itself. A logic criterion may be applied to the values of the gradient vector, e.g. requiring that more than one, such as at least three, of the gradient vector elements need to exceed a common threshold or their respective threshold values (if different).

4. Determining the feedback/echo path change as $g_O(n)>$THV in step 3, if said feedback criterion is fulfilled.

If the feedback criterion is fulfilled, a first action may be taken. If the feedback criterion is not fulfilled, a second action or no action may be taken. An action may e.g. comprise to initiate a change of feedback/echo path estimate, e.g. as in FIG. 4 (or change an adaptation rate of the adaptive algorithm), or change a mode of operation, e.g. related to directionality, etc.

The feedback path instability detector may be configured to determine current gradient values in the form of gradients to adapt one or more of the current filter coefficients of the adaptive filter and to provide smoothed and possibly further processed, versions thereof, wherein the instability criterion comprises a comparison of the current gradient values to one or more threshold values.

The hearing aid may be constituted by or comprise an air-conduction type hearing aid, a bone-conduction type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output stage for providing a stimulus perceived by the user as an acoustic signal based on a processed electric signal. The output stage may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input stage for providing an electric input signal representing sound. The input stage may comprise an input transducer, e.g. a microphone, for converting an input sound to an electric input signal. The input stage may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, or a digital modulation scheme.

The wireless link may be based on Bluetooth technology (e.g. Bluetooth Low-Energy technology) or ultra-wide band technology (UWB).

The hearing aid may be or form part of a portable (i.e. configured to be wearable) device, e.g. a device comprising a local energy source, e.g. a battery, e.g. a rechargeable battery.

The hearing aid may comprise a forward or signal path between an input stage (e.g. an input transducer, such as a microphone or a microphone system and/or direct electric input (e.g. a wireless receiver)) and an output stage, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input stage, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classifier configured to classify the current situation based on input signals from (at least some of) the detectors, and possibly other inputs as well. The classifier may be based on or comprise a neural network, e.g. a trained neural network.

The hearing aid may comprise an acoustic (and/or mechanical) feedback control (e.g. suppression) or echo-cancelling system. Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids or other audio systems. Some other classic situations with feedback problems are telephony, public address systems, headsets, audio conference systems, etc. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The feedback control system may comprise a feedback estimator for providing a feedback signal representative of an estimate of the acoustic feedback path, and a combiner, e.g. a subtractor, for subtracting the feedback signal from a signal of the forward path (e.g. as picked up by an input transducer of the hearing aid). The feedback estimator may comprise an update part comprising an adaptive algorithm and a variable filter part for filtering an input signal according to variable filter coefficients determined by said adaptive algorithm, wherein the update part is configured to update said filter coefficients of the variable filter part with a configurable update frequency $f_{upd}$ or be event-driven, e.g. when a sudden (substantial) change in the feedback path occurs.

The update part of the adaptive filter may comprise an adaptive algorithm for calculating updated filter coefficients for being transferred to the variable filter part of the adaptive filter. The timing of calculation and/or transfer of updated filter coefficients from the update part to the variable filter part may be controlled by an activation controller. The timing of the update (e.g. its specific point in time, and/or its update frequency) may preferably be influenced by various properties of the signal of the forward path, e.g. a sudden change of the feedback path. The update control scheme is preferably supported by one or more detectors (e.g. a loop gain detector or a feedback detector, etc.) of the hearing aid, preferably included in a predefined criterion comprising the detector signals.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user.

Other similar devices wherein feedback or echo may occur (e.g. comprising an input transducer in proximity of an output transducer) may benefit from the teaching of the present disclosure. Such similar devices may e.g. include a headset, an earphone, an ear protection device or a combination thereof. Likewise, a speakerphone (comprising a number of input transducers and a number of output transducers, e.g. for use in an audio conference situation), e.g. comprising a beamformer filter, e.g. providing multiple beamforming capabilities may benefit from the feedback control scheme of the present disclosure.

Use:

In an aspect, use of a hearing aid as described above, in the 'detailed description of embodiments' and in the claims, is moreover provided. Use may be provided in a system comprising audio distribution, e.g. a system comprising an input transducer (e.g. a microphone) and an output transducer (e.g. a loudspeaker) in sufficiently close proximity of each other to cause feedback from the loudspeaker to the microphone during operation by a user. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid configured to be worn by a user is furthermore provided by the present application. The method comprises

- providing an electric input signal representing sound in an environment of the user, converting a processed version of said electric input signal to stimuli perceivable by the user as sound;

controlling external feedback from the output transducer to the input transducer by S1. estimating an instant open loop transfer function;

S2. providing a current estimate of the feedback path transfer function

S3. computing an instant estimate of a feedback path transfer function;

S4. updating the current estimate of the feedback path transfer function.

The method may further comprise that the estimate of the instant feedback path transfer function ($\hat{H}_{post}(k,n)$) is determined in dependence of a forward path transfer function F(k,n), an instant open loop gain estimate ($\hat{L}_{fast}(k, n)$), and optionally a current estimate ($\hat{H}_{pre}(k, n)$) of the feedback path transfer function.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may further comprise

S1.1 computing an instability criterion;

if the instability criterion is not fulfilled, go to step S1;

if the instability criterion is fulfilled, go to step S3.

The method may comprise providing an estimate ($\hat{H}_{pre}(k, n)$) of the current feedback path transfer function (H) from an output transducer to an input transducer of the hearing aid. The estimate of the current feedback path transfer function may e.g. be based on an adaptive algorithm, e.g. an LMS, or an NLMS algorithm.

The instability criterion may be based on magnitude, phase, or derivatives of magnitude and phase of the electric input signal, or a signal derived therefrom. The feedback instability criterion may e.g. be based on any one of loop magnitude, loop phase, loop magnitude difference, and loop phase difference, or combinations thereof (see e.g. EP3291581A2).

Loop magnitude (LpMag) at time instant m may be determined as $$\mathrm{LpMag}(k,m)=Mag(k,m)-Mag(k,m_D),$$

where Mag(k,m) is the magnitude value of the electric input signal at time m, whereas Mag(k,$m_D$) denotes the magnitude of the electric input signal one feedback loop delay D earlier.

Loop phase LpPhase (in radian) at time instant m may be determined as $$\mathrm{LpPhase}(k,m)=\mathrm{wrap}(\mathrm{Phase}(k,m)-\mathrm{Phase}(k,m_D)),$$

where wrap(·) denotes the phase wrapping operator, the loop phase thus having a possible value range of [−π, π], and where Phase(k,m) and Phase(k,$m_D$) are the phase value of the electric input signal, at time instant m and at one feedback loop delay D earlier, respectively.

Loop magnitude difference LpMagDiff(k, m) at time instant m may be determined as $$\mathrm{LpMagDiff}(k,m)=\mathrm{LpMag}(k,m)-\mathrm{LpMag}(k,m_D).$$

where LpMag(k,m) and LpMag(k,$m_D$) are the values of the loop magnitude LpMag at time instant m and at a time instant $m_D$, one feedback loop delay D earlier, respectively.

Loop phase difference LpPhaseDiff(k,m) at time instant m may be determined as $$\mathrm{LpPhaseDiff}(k,m)=\mathrm{wrap}(\mathrm{LpPhase}(k,m)-\mathrm{LpPhase}(k,m_D)).$$

where LpPhase(k,m) and LpPhase(k,$m_D$) are the values of the loop phase LpPhase at time instant m and at a time instant $m_D$, one feedback loop delay D earlier, respectively.

The instability criterion may e.g. be based on a criterion regarding loop magnitude (LpMag):

$$\mathrm{LpMagDet}(k,m)=\min(\mathrm{LpMag}(k,m),\ \ldots\ ,\mathrm{LpMag}(k,m_{N\cdot D}))>\mathrm{MagThresh},$$

where N is a number of loop delays, $M_{N\cdot D}$ is the time instant N feedback loop delay D earlier, and MagThresh is a loop magnitude threshold value. Example values of N may be 0, 1, 2, . . . . The magnitude threshold value MagThresh may be equal to −3 dB, or −2 dB, or −1 dB, or 0 dB, or +1 dB, or +2 dB, or +3 dB. The magnitude feedback detection signal LpMagDet may be a binary signal (0 or 1).

The instability criterion may e.g. be based on loop phase (LpPhase):

$$\mathrm{LpPhaseDet}(k,m)=\mathrm{abs}(\mathrm{LpPhase}(k,m))<\mathrm{PhaseThresh},$$

where PhaseThresh is a threshold value. The loop phase threshold value PhaseThresh may be smaller than or equal to 0.5, 0.4, 0.3, 0.2, 0.1, 0.05, or 0.01 . . . (radians). In an embodiment, the phase feedback detection signal LpPhaseDet is a binary signal (0 or 1).

The instability criterion may e.g. be based on a combination of the criteria for loop magnitude and loop phase feedback conditions as $$Fb\mathrm{Det}(k,m)=\mathrm{and}(\mathrm{LpMagDet}(k,m),\mathrm{LpPhaseDet}(k,m)).$$

The feedback detection signal FbDet may e.g. be a binary signal (0 or 1). The expression and(crit1,crit2) is taken to mean that for the expression to be true criterion 1 (crit1) as well as criterion 2 (crit2) have to be fulfilled.

The instability criterion for feedback detection may be determined based on a combination of criteria for loop magnitude (LpMag) and loop phase difference (LpPhaseDiff) feedback conditions, $$Fb\mathrm{Det}(k,m)=\mathrm{and}(\mathrm{LpMagDet}(k,m),\mathrm{LpPhaseDiffDet}(k,m))$$

where a criterion for the loop phase difference feedback condition is defined as $$\mathrm{LpPhaseDiffDet}(k,m)=\mathrm{abs}(\mathrm{LpPhaseDiff}(k,m))<\mathrm{PhaseDiffThresh}.$$

The loop magnitude threshold value MagThresh may be equal to −1.5 dB, and the loop phase difference threshold value PhaseDiffThresh may be equal to 0.3.

The instability criterion may be based on comparing smoothed versions of one or more gradient values of the adaptive algorithm to one or more threshold values.

The instability criterion may be fulfilled when the one or more gradient values or a weighted combination of said one or more gradient values are or is larger than the one or more threshold values.

An instability criterion based on the gradient values as described in the present application (e.g. exemplified in FIG. 5, 6) may e.g. be used to initiate/activate the feedback change estimator according to the present disclosure (cf. e.g. FIG. 4). It may, however, also be used as a stand-alone (independent) method, without (necessarily) triggering the process described in claim 1 (and exemplified in FIG. 4). It can directly trigger other actions/processes (e.g. on adaptive algorithms, e.g., adaptation speed and constraints).

In a further aspect, method of operating a hearing aid, the hearing aid being configured to be worn by a user, the hearing aid comprising a forward path comprising

- an input transducer (IT) configured to convert sound in an environment of the user to an electric input signal (X) representing said sound,
- a processor (PRO) for processing said electric input signal (X) or a signal derived therefrom and for providing a processed signal (U);
- an output transducer (OT) for converting said processed signal to stimuli perceivable by the user as sound.

The method comprises

- providing a forward path transfer function (F(k,n)), where k and n are frequency and time indices, respectively,
- handling external feedback (H) from the output transducer to the input transducer by
  - providing an instant open loop gain estimate ($\hat{L}_{fast}$(k, n));
  - adaptively providing a current estimate ($\hat{H}_{pre}$(k, n)) of a feedback path transfer function (H),
  - adaptively providing an estimate ($\hat{V}$) of the current feedback signal from the output transducer (OT) to the input transducer (IT) based on said current estimate ($\hat{H}_{pre}$(k, n)) of the feedback path transfer function and the processed signal (U);
  - subtracting said current estimate ($\hat{V}$) of the feedback signal from said electric input signal (X), or a processed version thereof, to provide a feedback corrected signal, termed the error signal (E),
  - providing an instant estimate ($\hat{H}_{post}$(k,n)) of the feedback path transfer function in dependence of said forward path transfer function F(k,n), said instant open loop gain estimate ($\hat{L}_{fast}$(k, n)), and optionally of said current feedback path estimate ($\hat{H}_{pre}$(k, n));
  - adaptively providing an update transfer function estimate ($\hat{H}'_{post}$(k, n)) in dependence of said instant estimate ($\hat{H}_{post}$(k, n)) of the feedback path transfer function.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND one or more auxiliary devices is moreover provided.

The hearing system may be adapted to establish a communication link between the hearing aid and the auxiliary device(s) to provide that information (e.g. control and status signals, possibly audio signals) can be exchanged or forwarded from one to the other.

The auxiliary device may comprise a remote control, a smartphone, or other portable or wearable electronic device, such as a smartwatch, a charging station, a TV-sound adapter, or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device (e.g. including to update software (e.g. firmware) of the aid) via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

The auxiliary device may comprise processing power adapted to execute one or more learning algorithms, such as neural networks (e.g. deep neural networks). The auxiliary device may be configured to assist processing of the hearing aid (or hearing aids in case of a binaural hearing aid system), e.g. to identify a current acoustic environment, e.g. based on the one or more learning algorithms executed on the auxiliary device. The auxiliary device may be configured to transfer results of such processing based on the one or more learning algorithms (e.g. a currently identified acoustic situation around the user and/or appropriate hearing aid settings to cope with such acoustic situation) to the hearing aid(s).

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system. The APP may be configured to assist the user in updating software of the hearing aid(s), e.g. to implement additional features of the hearing aid(s).

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output stage for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output stage may comprise an output transducer, such as e.g. a loudspeaker for providing an air-borne acoustic signal or a vibrator for providing a structure-borne or liquid-borne acoustic signal.

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications where an input transducer and an output transducer of an acoustic system are close to each other.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
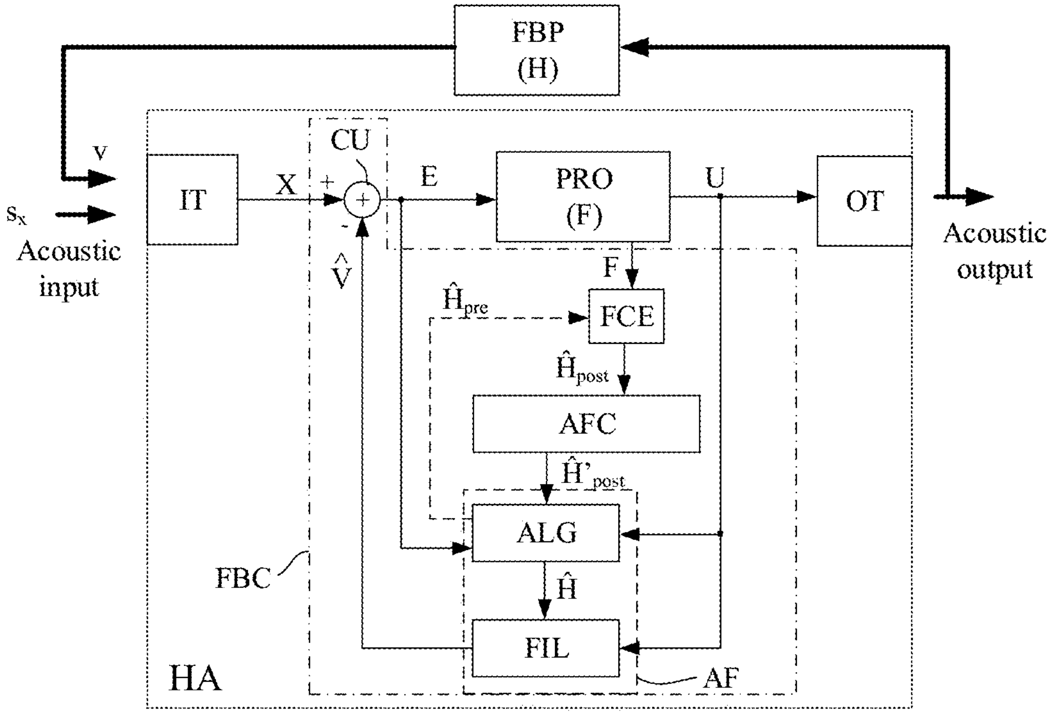
FIG. 1A shows a first embodiment of a hearing aid comprising a feedback control system according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to feedback control. Feedback estimation may be provided by an adaptive filter comprising a variable filter whose transfer function (e.g. governed by filter coefficients) can be dynamically updated to estimate a feedback path from an output transducer to an input transducer. The dynamic determination and update of the transfer function may be generally handled by an adaptive algorithm, such as an LMS or NLMS algorithm as is known in the art. By sudden changes of the feedback path, however, there may be a need for a more instant (event driven) determination and update of the transfer function (e.g. to enhance convergence of the adaptive algorithm).

We propose a general method of improving the convergence/tracking abilities of the adaptive filter, by using an estimation of the true open loop transfer function L(k,n), at the frequency index k and time index n, given by $$L(k,n)=H_{res}(k,n)\cdot F(k,n), \quad (1)$$

where $H_{res}(k, n)=(H(k, n)-\hat{H}(k, n))$, and where H(k,n) denotes the transfer function for the unknown feedback path, H(k,n) denotes the transfer function of the estimated feedback path, and F(k,n) is the known forward path transfer function in a hearing aid.

In a traditional feedback cancellation system, the adaptive filter provides a feedback path estimate (based on an estimate H(k,n) of the feedback path transfer function). However, it has limited convergence/tracking abilities in dynamic feedback situations.

Embodiments of a hearing aid comprising a feedback control system (FBC, as e.g. illustrated in FIG. 1A) according to the present disclosure are illustrated in FIGS. 1A and B.

Figure 1B:
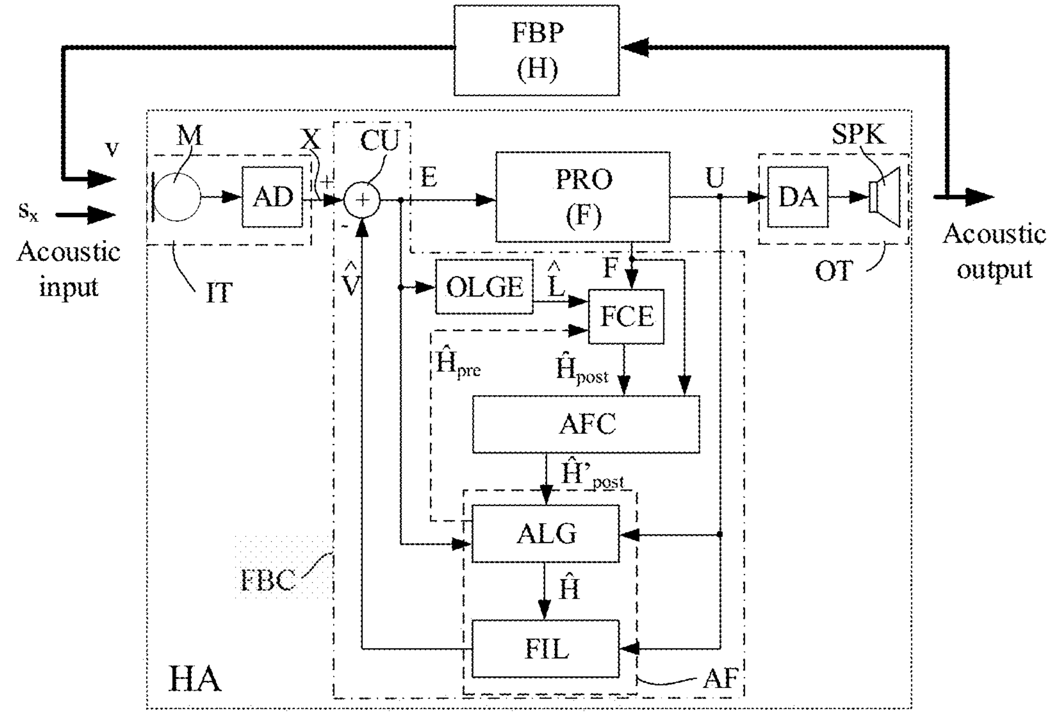
FIG. 1B shows a second embodiment of a hearing aid comprising a feedback control system according to the present disclosure.

The embodiments of a hearing aid (HA) of FIGS. 1A and 1B both comprise a forward path for processing an audio sound signal ('Acoustic input'). The audio sound signal may comprise a mixture of sound s, of origin external to the hearing aid (e.g. speech ad noise) and feedback sound v from an output transducer (OT) to an input transducer (IT) of the hearing aid. The feedback path (FBP) from the output transducer to the input transducer has a (frequency) transfer function H. The forward path comprises the input transducer (IT) configured to convert sound in an environment of the user to an electric input signal (X) representing the audio sound signal (where $X=S_x+V$, $S_x$ and V being the electric (possibly digitized, possibly frequency domain) equivalents of sound signals $s_x$ and v). The input transducer (IT) may comprise a microphone (M) for converting sound to an electric signal. The input transducer may further comprise an analogue to digital converter (AD) for converting an analogue electric signal from the microphone (M) to a digitized signal (X) comprising a stream of digitized samples (cf. FIG. 1B). The input transducer (IT) may comprise further circuitry for processing the input signal, such as e.g. an analysis filter bank to provide the electric input signal in a time frequency representation (k,n) as the case may be (k, n being frequency and time-frame indices, respectively). The forward path further comprises a processor (PRO) for processing the electric input signal (X), or a signal derived therefrom (e.g. a feedback corrected signal E), and for providing a processed signal (U). The forward path further comprises an output transducer (OT) for converting the processed signal (U), or a signal derived therefrom, to stimuli perceivable by the user as sound ('Acoustic output'). The forward path is configured to provide a forward path transfer function (F). The forward path transfer function (F) may e.g. be configured to compensate for a hearing impairment of a user of the hearing aid. The hearing aid (HA) further comprise a feedback control system (FBC) for handling external feedback from the output transducer (OT) to the input transducer (IT), cf. feedback sound signal v. The feedback control system comprises an adaptive filter (AF) comprising an algorithm part (ALG) and a variable filter part (Filter). The algorithm part (ALG) comprises an adaptive algorithm configured to provide updated filter coefficients ($\hat{H}$) to the variable filter (FIL). The updated filter coefficients represent an estimate ($\hat{H}$) of the current transfer function (H) of the feedback path (FBP). The adaptive filter (AF) is configured to provide an estimate (V) of the current feedback signal (v (V)) from the output transducer (OT) to the input transducer (IT) in dependence of an error signal E (X−$\hat{V}$) and a reference signal (processed signal U), and a further signal ($\hat{H}'_{post}$) providing an instant feedback estimate (in certain situations when the feedback path changes fast). The feedback control system further comprises a combination unit (CU) located in the forward path and configured to subtract the current estimate (V) of the feedback signal (v (V)) from the electric input signal (X), and to provide a feedback corrected signal (E=X−$\hat{V}$), termed the error signal. The processor (PRO) is configured to base its processing on the error signal (E).

In the embodiment of FIG. 1A, the feedback control system (FBC) further comprises a feedback change estimator (FCE) configured to—at least in certain situations when the feedback path changes fast (e.g. when a feedback instability criterion is fulfilled)—provide an instant estimate ($\hat{H}_{post}$) of the feedback path transfer function in dependence of the forward path transfer function (F), and, optionally, of the current estimate ($\hat{H}_{pre}$) of the feedback path transfer function from the adaptive algorithm. The feedback control system further comprises an adaptive filter controller (AFC) for providing an update transfer function estimate ($\hat{H}'_{post}$) for the adaptive filter (AF) in dependence of the estimate ($\hat{H}_{post}$) of the instant feedback path transfer function. The estimate ($\hat{H}_{post}$) of the instant feedback path transfer function is intended to be provided from one time index (n) to the next (n+1) (as opposed to the current estimate ($\hat{H}_{pre}$) of the feedback path transfer function provided by the (adaptive algorithm (ALG) of the) adaptive filter (AF)). This is particularly relevant in case of a sudden change in the feedback path, where the adaptive estimate ($\hat{H}_{pre}$) will take some time instances to converge towards the changed feedback path (depending on the algorithm and the adaptation rate, e.g. on a time step of each iteration). The instant estimate ($\hat{H}'_{post}$) of the feedback path transfer function is intended to override the estimate ($\hat{H}_{pre}$) of the current feedback path transfer function provided by the adaptive filter (AF) to thereby provide a faster convergence of the adaptive algorithm (ALG).

The feedback control system may comprise a feedback instability detector for monitoring the fulfillment of a feedback path instability criterion (e.g. indicating a sudden change or instability of the feedback path transfer function). The feedback instability detector may e.g. form part of or be connected to the feedback change estimator (FCE). It is the intention that the adaptive algorithm continues its feedback path estimation using the estimate ($\hat{H}'_{post}$) of the instant feedback path transfer function and to let the adaptive algorithm continue its adaptation from there (see e.g. FIG. 4). In such case (after a sudden change of the feedback path, e.g. upon fulfillment of the feedback instability criterion), the resulting estimate of the feedback path transfer function provided by the feedback control system ($\hat{H}$) is equal to ($\hat{H}_{post}$(n) or $\hat{H}'_{post}$(n)), whereas under 'stable' (or slowly changing) feedback path conditions, the resulting estimate of the feedback path transfer function provided by the feedback control system ($\hat{H}$) is equal to the current estimate ($\hat{H}_{pre}$(n)) of the feedback path transfer function provided by the adaptive algorithm.

FIG. 1B shows a second embodiment of a hearing aid (HA) comprising a feedback control system (FBC) according to the present disclosure. The embodiment of FIG. 1B is similar to the embodiment of FIG. 1A. In the embodiment of FIG. 1B the input transducer (IT) is shown to comprise a microphone (M) for converting sound to an electric signal, and an analogue to digital converter (AD) for converting an analogue electric signal from the microphone (M) to a digitized signal (X) comprising a stream of digitized samples. As in FIG. 1A, the input transducer (IT) may comprise further circuitry for processing the input signal, such as e.g. an analysis filter bank to provide the electric input signal in a time frequency representation (k,n). Further, in the embodiment of FIG. 1B the output transducer (OT) is shown to comprise digital to analogue converter (DA) for converting a stream of digitized samples to an analogue signal which is fed to a loudspeaker (SPK) for converting the analogue signal to sound ('Acoustic output'). The output transducer (OT) may alternatively comprise a vibrator of a bone conducting hearing aid. The output transducer (OT) may further comprise a synthesis filter bank for converting a frequency sub-band representation of the output signal to a time domain signal. Compared to the embodiment of FIG. 1A, the embodiment of FIG. 1B further comprises an open loop gain estimator (OLGE) for providing an instant open loop gain estimate (L) of the forward path of the hearing aid. In the embodiment of FIG. 1B, the feedback change estimator (FCE) is configured to provide the instant estimate ($\hat{H}_{post}$) of the feedback path transfer function in dependence of the forward path transfer function (F) received from the processor (PRO), as well as the instant open loop gain estimate ($\hat{L}$) received from the open loop gain estimator (OLGE) and, optionally, in dependence of the current estimate ($\hat{H}_{pre}$) of the feedback path transfer function provided by the adaptive algorithm. The instant open loop gain estimate ($\hat{L}$) of the open loop transfer function (termed $\hat{L}_{fast}$(k, n)) may e.g. be provided as described in the following.

In the following, a method to instantly estimate the open loop transfer function L(k,n) of a hearing aid is proposed. A corresponding fast estimate $\hat{L}_{fast}$ (k, n) is then used to detect instability and to improve the adaptive filter estimate $\hat{H}$(k,n) of the feedback path transfer function upon critical changes of feedback situations. This is illustrated in the below flow-chart of FIG. 2.

Figure 2:
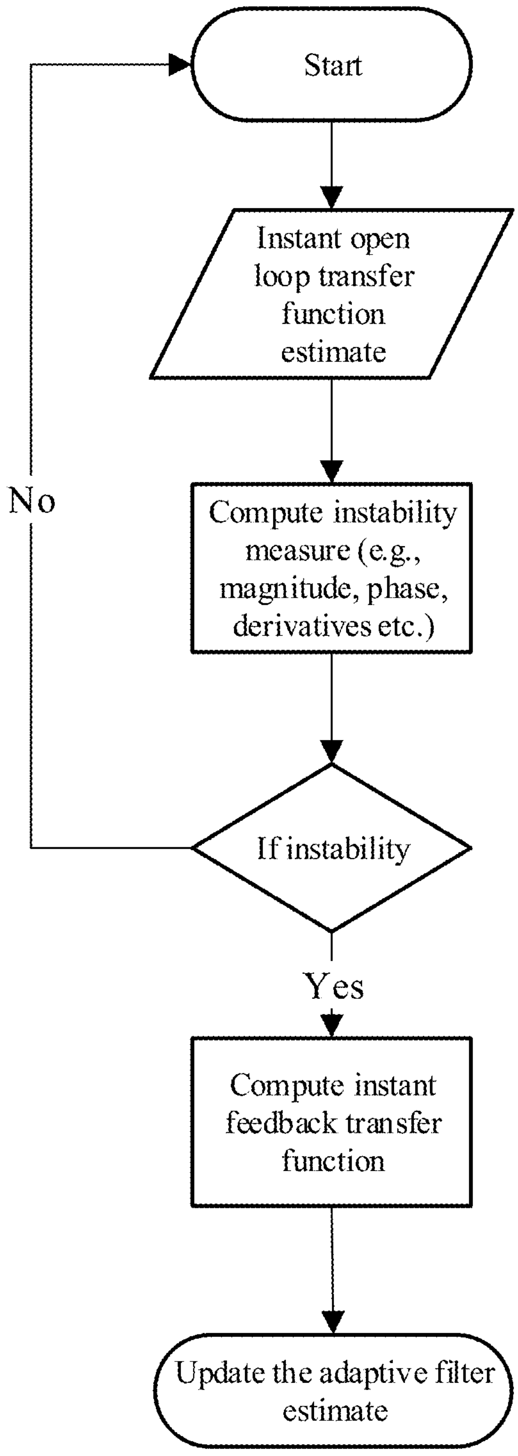
FIG. 2 shows a flowchart describing a scheme for updating a feedback estimate of a feedback control system according to the present disclosure.

FIG. 2 shows a flowchart describing a scheme for updating a feedback estimate of a feedback control system according to the present disclosure.

Instant Open Loop Transfer Function Estimate. Compute Instability Measure (e.g., Magnitude, Phase, Derivatives Etc.):

First, in order to decide on stability or instability, we estimate a fast (or 'instant') open loop transfer function denoted by $\hat{L}_{fast}$(k, n). The fast/instant open loop transfer function can be calculated in several ways, e.g. as $$\hat{L}_{fast}(k,n) = E(k,n)/E(k,n-D)\Big| \begin{array}{l}\text{if } |\hat{L}_{fast}(k,n)| < \text{threshold} => \text{stable} \\ \text{else} => \text{unstable}\end{array}$$

where E(k,n) represents the so-called error signal in a typical adaptive filter configuration (see signal E in FIG. 1A, 1B), D represents a loop delay (se e.g. FIG. 3) of the audio path of the hearing aid, so that E(k,n-D) represents the error signal one loop delay earlier than E(k,n). If there is an instant and critical change of feedback path from $H_{pre}(k,n)$ to $H_{post}(k,n)$ (see e.g. FIG. 4), we expect/assume the estimation of $\hat{L}_{fast}(k, n)$ is very accurate. Such a critical change of feedback path may lead to system instability. The reason that it can be assumed that the estimate of the instant open loop transfer function is quite accurate in this case is because the feedback to signal ratio (e.g. $|V|/|S_x|$ in FIG. 1A, 1B) is high as there is a significant portion of feedback signal (V) after such a change from $H_{pre}(k,n)$ to $H_{post}(k,n)$.

If Instability, Compute Instant Feedback Transfer Function:

Then, if a critical change of the feedback path has been detected, the estimate $\hat{L}_{fast}(k, n)$ and the known forward path transfer function F(k,n) are used to further make an approximation of the feedback path estimate $\hat{H}_{post}$, with the following steps.

Based on Eq. (1), we define the true instant open loop transfer function $L_{post}(k,n)$ using the true feedback path transfer function after the instant feedback path change $H_{post}(k,n)$, and the current feedback path estimate $\hat{H}_{pre}(k,n)$ from just before the instant path change, as $$L_{post}(k,n)=(H_{post}(k,n)-\hat{H}_{pre}(k,n))\cdot F(k,n), \tag{2}$$

after rearranging, we obtain, $$H_{post}(k,n)=L_{post}(k,n)/F(k,n)+\hat{H}_{pre}(k,n). \tag{3}$$

Now, replacing the true $L_{post}(k,n)$ with the estimate $L_{fast\_post}(k, n)$, we can then make an approximation $\hat{H}_{post}(k,n)$ of the unknown $H_{post}(k,n)$, as $$\hat{H}_{post}(k,n)=\hat{L}_{fast\_post}(k,n)/F(k,n)+\hat{H}_{pre}(k,n). \tag{4}$$

Update the Adaptive Filter Estimate:

Finally, control parameters α,β=[0 . . . 1] may be introduced. The control parameters are intended for controlling an update of the adaptive filter estimate $\hat{H}(k,n)$ based on the estimate of instant feedback path $\hat{H}_{post}(k, n)$ from Eq. (4), as $$\hat{H}'_{post}(k,n)=\alpha\cdot\hat{L}_{fast\_post}(k,n)/F(k,n)+\beta\cdot\hat{H}_{pre}(k,n). \tag{5}$$

In an extreme exemplary case, where the magnitude of $\hat{L}_{post}(k, n)$ is big, e.g. ≥10 dB, and assume it is due to an instant change of $H_{post}(k, n)$ and $|H_{post}(k, n)|>>|\hat{H}_{pre}(k, n)|$, i.e., the contribution from the adaptive filter $\hat{H}_{pre}(k, n)$ is negligible compared to the instant feedback path change $H_{post}(k, n)$ right after the critical change of the feedback situation, we would update the feedback path estimate by using (k, n) as $$\hat{H}(k,n)\approx L_{post}(k,n)/F(k,n), \tag{6}$$

by setting the parameters α=1 and β=0 in Eq. (5). In other less extreme cases, we would use the full equation in Eq. (5) with appropriate values of α and β. The parameters of α and β could be chosen based on the magnitude of the loop gain estimate $\hat{L}_{post}(k, n)$, e.g. if $|\hat{L}_{post}(k, n)|$ is high (e.g. ≥6 dB) α=1 and β=0; if e.g. $|\hat{L}_{post}(k, n)|$ is medium α=0.5 and β=0.5.

This method/procedure is possible, since the estimation of $\hat{L}_{fast}(k, n)$ can be done very fast and reliably when the true magnitude of the open loop transfer function is indeed high, followed by a critical feedback path change; hence, the estimation of $\hat{H}_{post}(k, n)$ in Eq. (4) is possible, and it is much faster than a traditional feedback cancellation system to reach $\hat{H}(k, n)=H_{post}(k, n)$ Therefore, it makes sense to use Eq. (5) to make an instant update of the adaptive filter estimate $\hat{H}(k, n)$. The advantage of this is an increased convergence/tracking ability without sacrificing steady state error.

Figure 4:
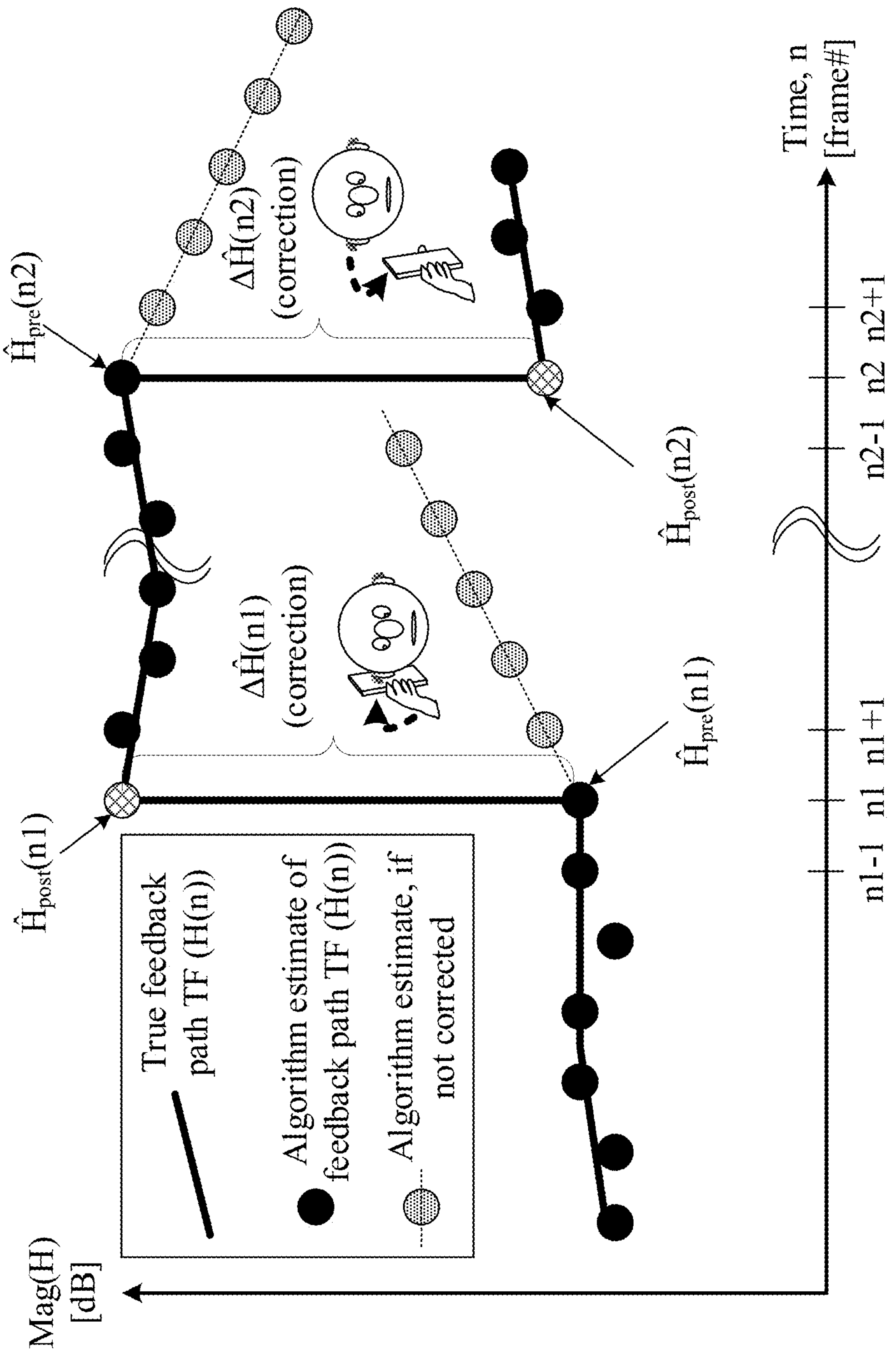

FIG. 4 schematically illustrates an example of an adaptive algorithm which is extraordinarily updated (after a sudden change in the feedback path) at a given value of a time index (n*) using the $\hat{H}_{post}(k,n^*)$ value, and how the algorithm continues its convergence after the abrupt change. The (physical) feedback change may occur from one time index n* to the next (n*+1). Or the feedback change may occur over a number of subsequent time indices (i.e. over one or more units of the time index). One unit of the time index may e.g. be equal to the duration of a time frame (which e.g. if a time frame contains 64 time samples produced at a sampling rate of 20 kHz amounts to 3.2 ms). A sudden change of feedback path may e.g. occur over the order of up to 1 s.

Figure 3:
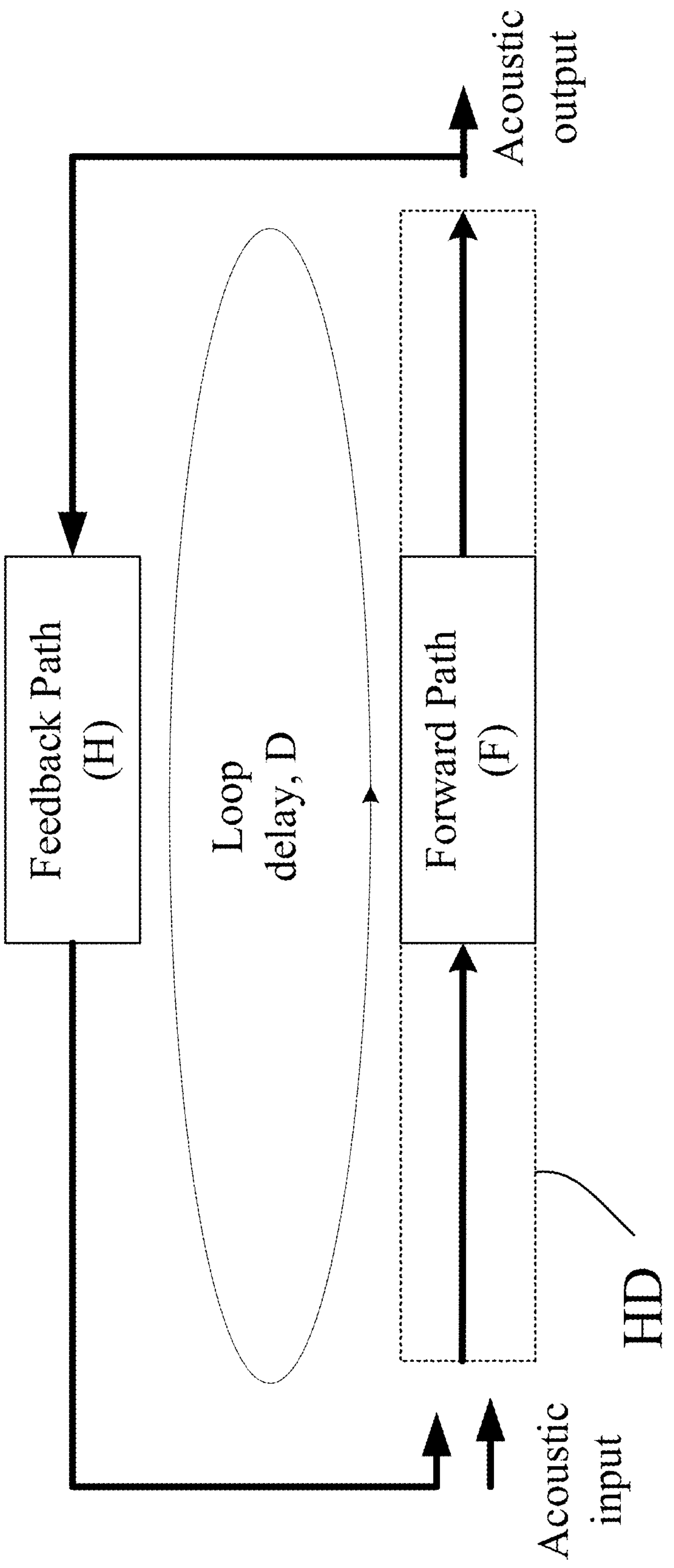
FIG. 3 shows the feedback loop of a hearing aid comprising an electric forward path from input to output transducer, and an acoustic (and/or mechanical) feedback loop from output to input transducer, FIG. 4 schematically shows an exemplary time dependence of a true feedback path and an estimated feedback path according to the present disclosure.

FIG. 3 shows the feedback loop of a hearing aid comprising an electric forward path from input to output transducer, and an acoustic (and/or mechanical) feedback loop from output to input transducer.

Knowledge (e.g. an estimate or a measurement) of the length of one loop delay is assumed to be available (in advance or estimated during use).

The loop delay D is defined as the time required for a signal travelling (once) through the acoustic loop, as illustrated in FIG. 3. The acoustic loop consists of the forward path (of the hearing aid), and the (acoustic) feedback path. The loop delay D is taken to include the processing delay d of the (electric) forward path (Forward Path (F)) of the hearing aid from input transducer (IT) to output transducer (OT) and the delay d' of the acoustic feedback path (Feedback Path (H)) from the output transducer to the input transducer of the hearing aid, i.e. Loop Delay D=d+d'.

Typically, the acoustic part d' of the loop delay is much less than the electric (processing) part d of the loop delay, d'<<d (in particular when the forward path comprises processing of signals in frequency sub-bands). The loop delay D may be approximated by the processing delay d of the forward path of the hearing aid (D d). The electric (processing) part d of the loop delay may e.g. be in the range between 2 ms and 10 ms, e.g. in the range between 5 ms and 8 ms, e.g. around 7 ms. The loop delay may be relatively constant over time (and e.g. determined in advance of operation of the hearing aid) or be different at different points in time, e.g. depending on the currently applied algorithms in the signal processing unit (d may e.g. be dynamically determined (estimated) during use). The hearing aid (HA) may e.g. comprise a memory unit wherein typical loop delays in different modes of operation of the hearing aid are stored. In an embodiment, the hearing aid is configured to measure a loop delay comprising a sum of a delay d of the forward path and a delay d' of the feedback path. A predefined (or otherwise determined) test-signal may e.g. be inserted in the forward path, and its round trip travel time measured (or estimated), e.g. by identification of the test signal when it arrives in the forward path after a single propagation (or a known number of propagations) of the loop. The test signal may be configured to included significant content at frequencies where feedback is likely to occur (e.g. in a range between 1 and 5 kHz).

FIG. 4 shows an exemplary time dependence of a true feedback path H and an estimated feedback path $\hat{H}$ according to the present disclosure. The graphs may represent values of a feedback path in a given frequency band (represented by frequency band index k (frequency domain)), or they may represent a full-band value (time domain). Values of (the magnitude of) feedback may e.g. be in the range between −200 dB and +10 dB, strongly dependent on the local acoustic environment around the hearing aid, e.g. within several m of the hearing aid (e.g. within a room wherein the hearing aid wearer is currently located). Each time unit, e.g. a time-frame length or a fraction thereof in case of overlapping time frames, may be of the order of 1 ms. For a given sampling frequency $f_s$ (e.g. 20 kHz) and a given number of samples $N_s$ per time frame (e.g. 64), the time frame length is $N_s/f_s$ (e.g. 3.2 ms).

FIG. 4 shows in solid line an exemplary true feedback path transfer function H magnitude (Mag(H) [dB]) versus time (Time, n [frame #]). The magnitude exhibits two sudden (abrupt) changes in an otherwise relatively stable course. The sudden changes in the true feedback path transfer function occurs at time instances n1 and n2. Such abrupt change may e.g. reflect that a telephone or other reflecting surface is held close to an ear of the user (as schematically indicated by the small insert drawings in FIG. 4 showing a telephone being moved to the ear and away from the ear of the user at time instances n1 and n2, respectively). As indicated in the drawing on the time axis and in the solid curve (by the two crossing curved lines, ff), there may be a time period between the two feedback path incidences (abrupt changes) that are not shown in the drawing (there may be a shorter (e.g. milli seconds) or longer (e.g. minutes) time period between n1 and n2, e.g. corresponding to a duration of a telephone conversation).

FIG. 4 further shows by discrete solid dots the estimates ($\hat{H}_{pre}$) of the feedback path transfer function as provided by a prior art adaptive algorithm (e.g. the Least Mean Square (LMS) or the Normalized LMS (NLMS) algorithms) and a combination of a prior art algorithm and the modification proposed by the present disclosure.

The lower left part of the dotted curve (before time n1, solid dots •) illustrates the estimate of the true feedback path transfer function indicated by the solid curve by an adaptive feedback estimation algorithm according to the prior art (e.g. an LMS or an NLMS algorithm). In this time period (n<n1), the true feedback path is relatively stable and does not change faster than the adaptive algorithm can reasonably follow it (with a given adaptation rate or step size of the algorithm). At time instant n1, the true feedback path is abruptly changed because the user moves a telephone apparatus to the ear. This induces a change ($\Delta\hat{H}$(n1)) (increase) in the feedback path transfer function, which the adaptive algorithm cannot immediately follow, as indicated by the slowly increasing estimate indicated by the grey dots in FIG. 4 for time instances n1+1, etc. The value of the feedback path transfer function provided by the adaptive algorithm at time instance n1 prior to (or at) the sudden change of feedback path is denoted $\hat{H}_{pre}$(n1). To improve on the (erroneous) feedback estimate provided by the adaptive algorithm, the 'next' estimate of the feedback path transfer function provided by the adaptive algorithm is (forced to be) based on a corrected (estimated) true feedback path (after the sudden change). The value of the feedback path transfer function provided according to the present disclosure to the adaptive algorithm at time instance n1 after the sudden change of feedback path is denoted $\hat{H}_{post}$(n1) and indicated by the cross-hatched dot in FIG. 4. The value $\hat{H}_{post}$(n1) may e.g. be estimated as indicated above.

The upper middle part of the dotted curve (after time n1, but before time n2, solid dots) illustrates the estimate $\hat{H}_{pre}$ of the true feedback path transfer function indicated by the solid curve provided by an adaptive feedback estimation algorithm according to the prior art (starting from the value of the feedback path, $\hat{H}_{post}$(n1), estimated according to the present disclosure). In this time period (n2>n>n1) (again), the true feedback path is relatively stable and does not change faster than the adaptive algorithm can reasonably follow it (with the given adaptation rate or step size of the algorithm). At time instant n2, the true feedback path is abruptly changed because the user moves a telephone apparatus away from the ear. This induces a change ($\Delta\hat{H}$(n2)) (decrease) in the feedback path transfer function, which (again) the adaptive algorithm cannot immediately follow, as indicated by the slowly decreasing estimate indicated by the grey dots in FIG. 4 for time instances n2+1, etc. The value of the feedback path transfer function provided by the adaptive algorithm at time instance n2 prior to (or at) the sudden change of feedback path is denoted $\hat{H}_{pre}$(n2). To improve on the (erroneous) estimate of the feedback transfer function provided by the adaptive algorithm, the 'next' estimate of the feedback path provided by the adaptive algorithm is (forced to be) based on a corrected (estimated) true feedback path transfer function (after the sudden change). The value of the feedback path provided according to the present disclosure to the adaptive algorithm at time instance n2 after the sudden change of feedback path is denoted $\hat{H}_{post}$(n2) and indicated by the cross-hatched dot in FIG. 4. The value $\hat{H}_{post}$(n2) may e.g. be estimated as indicated above.

The lower right part of the dotted curve (after time n2, solid dots •) illustrates the estimate $\hat{H}$ of the true feedback path transfer function indicated by the solid curve provided by an adaptive feedback estimation algorithm according to the prior art (starting from the value of the feedback path, $\hat{H}_{post}$(n2), estimated according to the present disclosure). In this time period (n>n2), the true feedback path is again relatively stable and does not change faster than the adaptive algorithm can reasonably follow it (with the given adaptation rate or step size of the algorithm).

Thereby an improved adaptive algorithm can be provided.

The output of the feedback estimation unit according to the present disclosure may (after a sudden change of the feedback path transfer function larger than a pre-determined threshold) be a value estimated according to the present disclosure, and otherwise be a value provided by a prior art adaptive algorithm (e.g. an LMS or an NLMS algorithm with fixed or adaptively controlled step size/adaptation rate). The prior art adaptive algorithm may be configured to base its estimate after a sudden change of the feedback path above a pre-determined threshold value on the value estimated according to the present disclosure.

Figure 5:
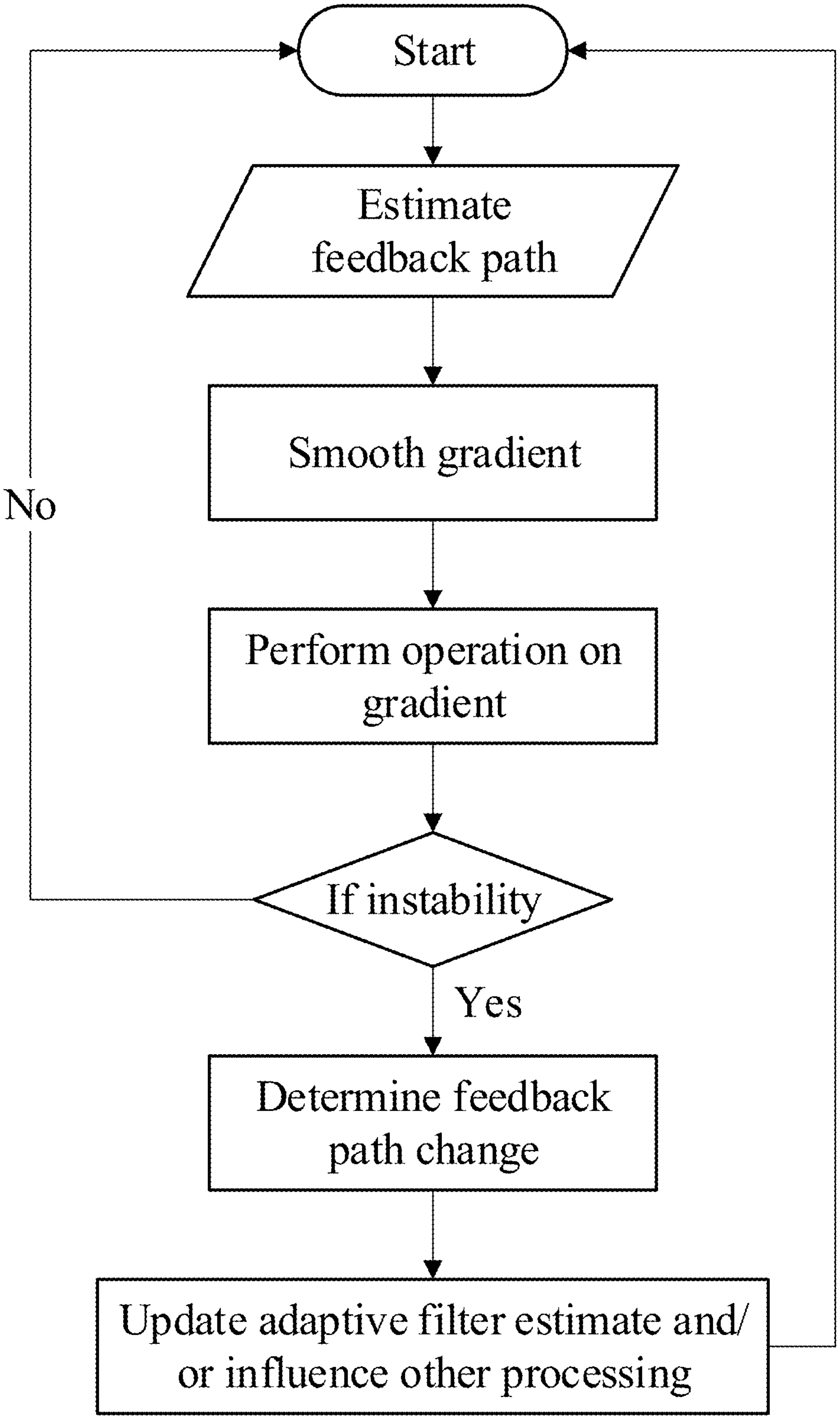
FIG. 5 shows a flow diagram for a method of detecting a sudden change of a feedback/echo path of a hearing aid or headset.

A Method of Detecting a Sudden Change in a Feedback/Echo Path:

FIG. 5 shows a flow diagram for a method of detecting a sudden change of a feedback/echo path of a hearing aid or headset.

The method may comprise at least some of the following steps:

1. Estimating a feedback path, e.g. using an adaptive algorithm.
2. Smoothing a gradient of the adaptive algorithm over time.

3. Perform an operation on the gradient, e.g. a logic operation, to provide a modified (smoothed) gradient.
4. Check whether the modified gradient fulfils an instability criterion, e.g. a threshold criterion. If the instability criterion is not fulfilled, repeat steps 1-4, otherwise go to step 5.
5. Determine a feedback path change from the gradient, and optionally
6. Update the adaptive feedback path estimate of the adaptive algorithm and/or adapt other processing of the device, e.g. directionality.

The instability criterion may be fulfilled when the one or more gradient values or a combination (e.g. an average), such as a weighted combination (e. a weighted average) of the one or more gradient values are or is larger than a threshold value.

Figure 6:
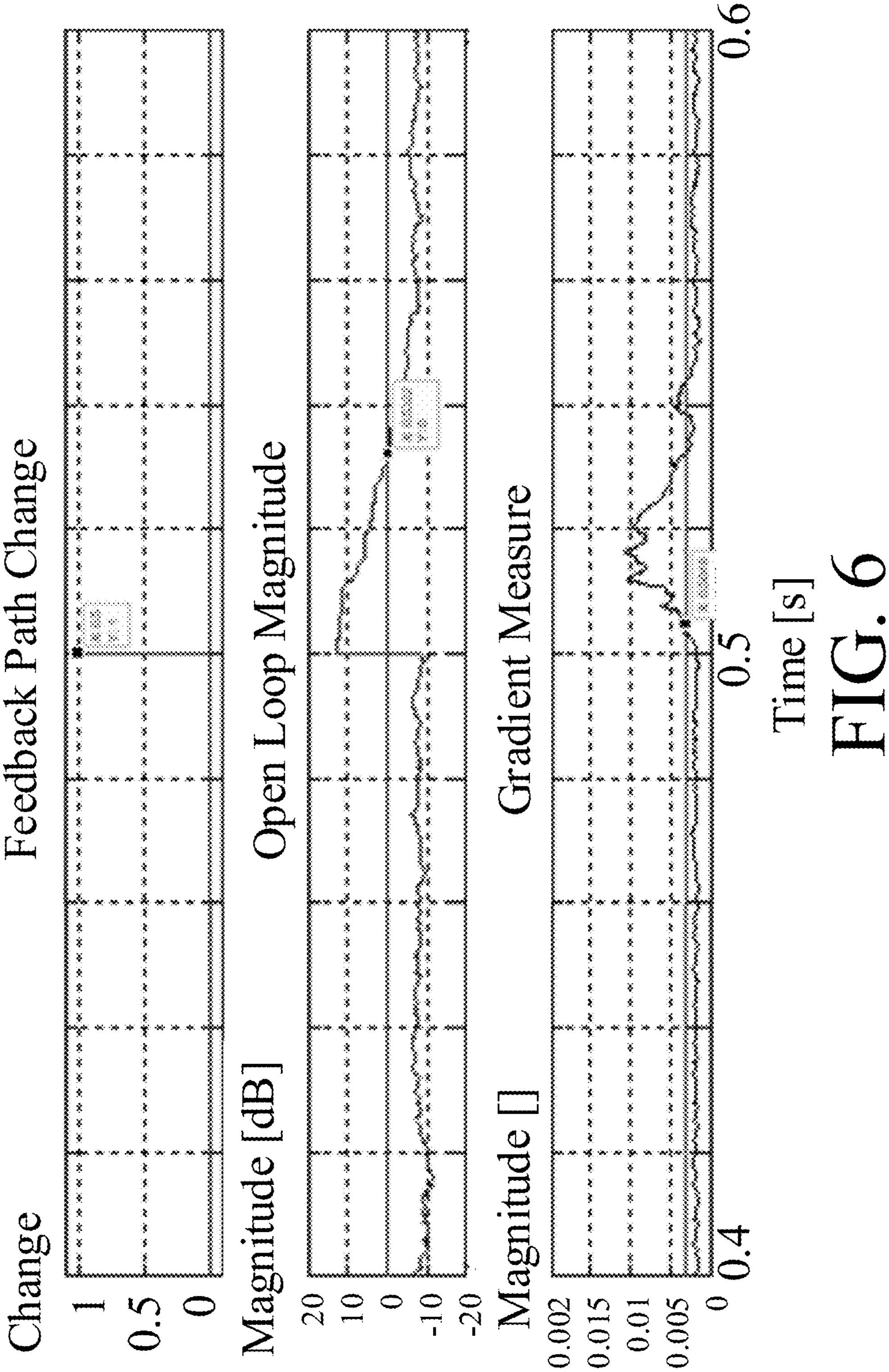
FIG. 6 shows exemplary waveforms of signals from which the sudden change of feedback/echo path can be identified according to a method of the present disclosure, FIG. 7 schematically illustrates a hearing aid according to the present disclosure when located in an ear canal close to the eardrum of a user.

FIG. 6 shows exemplary waveforms of signals from which the sudden change of feedback/echo path can be identified according to a method of the present disclosure. The three (interrelated) waveforms of FIG. 6 illustrate time dependence of three different parameters during a time period of 0.2 s from t=0.4 s to t=0.6 s, cf. horizontal axis denoted Time [s] in the lower part of FIG. 6. A standard feedback cancellation system based on an adaptive filter estimation of the feedback/echo path is assumed to be active.

The first (upper) plot, denoted 'Feedback Path Change', shows that there is a sudden or substantial (here ideally instantaneous) feedback path change at t=0.5 s. The size of the feedback path change is indicated along the vertical axis on a relative scale denoted 'Change' between 0 and 1.

The second (middle) plot, denoted 'Open Loop Magnitude', shows open loop magnitude versus time in dependence of the feedback path change of the upper plot. The size of the open loop magnitude is indicated along the vertical axis denoted 'Magnitude [dB] ' on a logarithmic scale between −20 dB and +20 dB. The sudden feedback change at t=0.5 results in a sudden change in open loop magnitude (of >20 dB) at t=0.5 s. It appears from the middle plot that it would take the adaptive filter more than 300 ms (from t=0.5 s to t≈0.53 s) before the open loop magnitude is again below the critical loop magnitude of 0 dB after the change (cf. the crossing of the graph with the (bold) horizontal line representing 0 dB occurring at t≥0.53 s).

The third (lower) plot, denoted Gradient Measure, shows the gradient versus time in dependence of the feedback path change of the upper plot. The size of the gradient measure is indicated along the vertical axis denoted 'Magnitude [ ]' on a linear scale between 0 and 0.002. The lower plot illustrates that using the gradient method with a simple threshold, here e.g. TH 0.03 (cf. steps 1-3 in the method of FIG. 5). The detection of significant feedback/echo path change is already possible after a short time compared to a normal convergence time of several hundred ms (here after −5 ms).

Thereby a correspondingly fast action can be taken, e.g. to make a change to the current value of the feedback estimate of the adaptive algorithm of the feedback cancellation system (cf. the (sudden) change from $\hat{H}_{pre}$ to $\hat{H}_{post}$ at time n1 in FIG. 4) and/or for influencing settings of a beamformer or performing other actions to the processing of the electric input signals.

A Hearing Aid Comprising an In-Ear Microphone

Hearing instruments for hearing loss compensation are currently programmed to a certain gain based on client data (hearing loss, age, gender, etc.) and a fitting rationale (e.g. NAL-NL2). The effective amplification at the tympanic membrane, however, can vary greatly based on the tolerances of the acoustic transducers (e.g. microphone and receiver (loudspeaker)), the user's external ear anatomy, and the placement of the instrument on the ear. This variation may easily be of the order of 10-20 dB up to 4 kHz and even more at higher frequencies. Given the potential variations, adjusting the fitting rationale by a few dB will probably not have the desired audible effect for all potential users. Part of this variance can of course be compensated for by doing real ear measurements (REM) using probe microphone equipment, but these measurements are not performed for all fittings and do not compensate for the altered acoustical environment after removing and reinserting the instrument.

One method to reduce this variance would be to place a monitor microphone inside the ear canal to measure the effective sound pressure level that is present at the ear drum. The amplification could then be measured and controlled accordingly in order to reach a defined target amplification. Previous attempts in adding a monitor microphone to an ITE instrument discovered many technical challenges. Furthermore, it requires an additional microphone which increases the size, the power consumption and complexity of the instrument. The present invention disclosure presents a hearing instrument setup, where at least some of these issues may be solved.

Recent developments in feedback management promise that the goal of providing a feedback-free hearing instrument may not be far away. Removing the feedback constraint opens the door to new opportunities, such as a 'reversed open invisible-in-canal (IIC)' hearing aid. Reversed open IIC type of hearing aid according to the present disclosure may e.g. exhibit one or more of the following characteristics (cf. FIG. 7 for reference):

- The microphone (M) is placed in the housing (Housing) AFTER the receiver (SPK) in a direction towards (and close to) the tympanic membrane (Eardrum).
- The hearing instrument (HD) does not seal the ear canal (Ear canal) so that as much direct sound ($S_{env}$) as possible reaches the tympanic membrane and the microphone (M).
- Both the receiver (SPK) and the microphone (M) are placed in the bony part (Bony part) of the ear canal and are hence protected against earwax.
- The setup may also be used as the external transducer unit of a receiver in the ear (RITE) type of hearing aid (where the microphone M may act as the microphone or one of the microphones of the RITE hearing aid).

Figure 7:
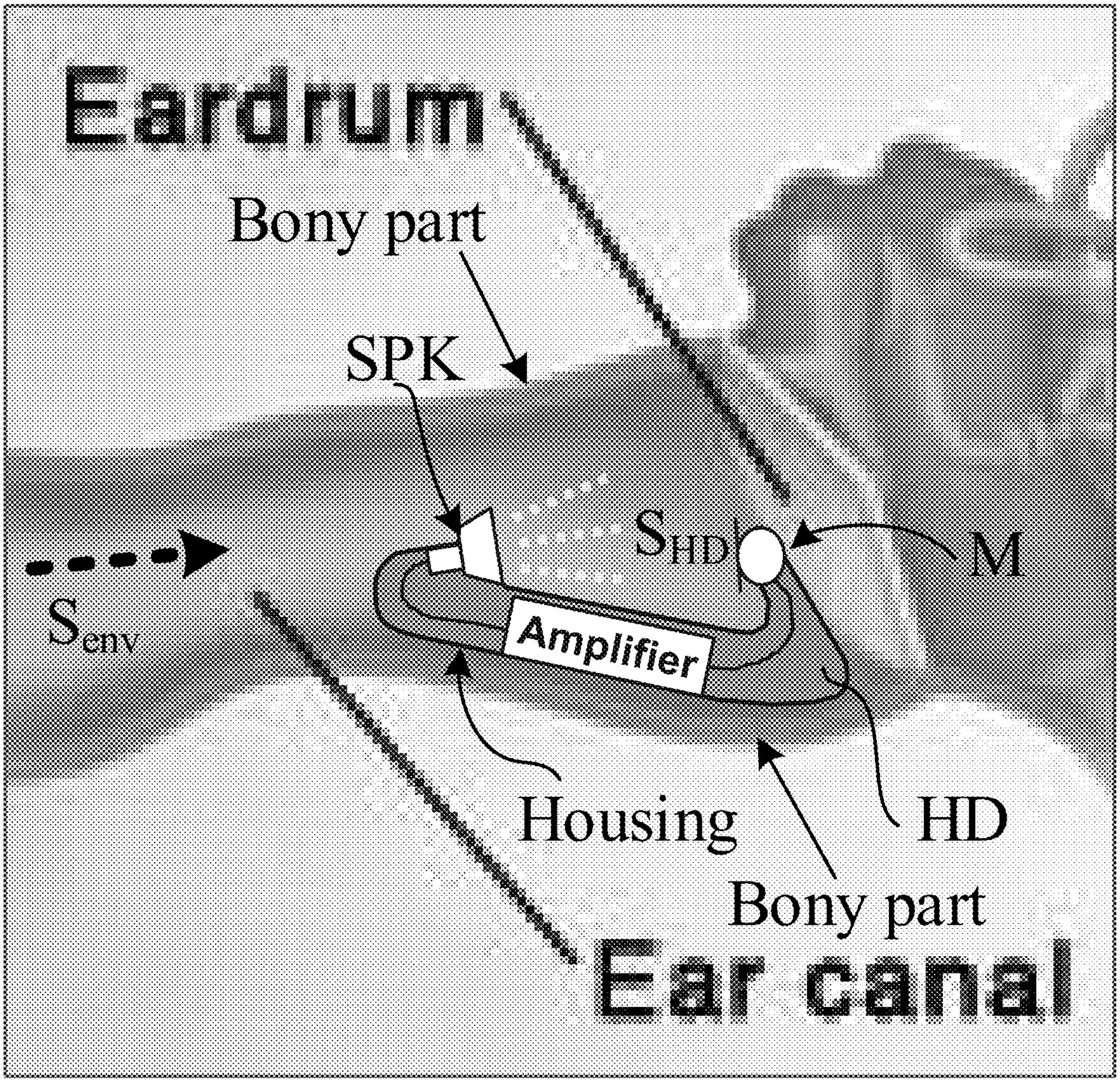

A further aspect of the present application relates to a hearing aid comprising of being constituted by an ITE-part adapted for being located in a bony part of the ear canal of a user (close to the eardrum). FIG. 7 shows a hearing aid according to this further aspect of the present disclosure when located in an ear canal close to the eardrum of a user.

A hearing aid (HD) comprising an elongate housing configured to be located in a bony part of an ear canal of the user is furthermore provide by the present disclosure. The hearing aid comprises a forward path for processing an audio signal. The forward path comprises a) an input transducer for picking up sound in the ear canal and adapted to provide an electric input signal representing said sound, b) a signal processor for processing said electric input signal, or a signal originating therefrom, and providing a processed signal, and c) an output transducer configured to convert the processed signal to output sound in dependence of said electric input signal. The hearing aid may further comprise a feedback control system for estimating and cancelling, or reducing, signal components in said electric input signal originating from a feedback path from the output transducer to the input transducer and to provide a feedback corrected input signal. A cross-sectional area of said housing may be smaller than a cross-sectional are of said bony part of the ear canal, when the hearing is mounted as intended. The input transducer and the output transducer may be mounted in the housing relative to each other so that the input transducer is closer to the eardrum than the output transducer.

The housing may have a longitudinal direction in a direction towards the eardrum, when the hearing aid is mounted as intended. The cross-sectional area of the housing may be smaller than a cross-sectional are of the bony part of the ear canal along the longitudinal direction of the housing. Thereby it is achieved that sound can relatively freely pass from the environment to the eardrum around or along the housing of the hearing aid when mounted as intended in the ear canal of the user.

The housing may comprise a sound outlet from the output transducer in a direction towards the eardrum when the hearing aid is mounted as intended in the ear canal of the user. Thereby sound vibrations from the output transducer are directed towards the eardrum of the user. The output transducer may be constituted by or comprise a loudspeaker.

The housing may comprise a sound inlet to the input transducer in a direction towards the environment, when the hearing aid is mounted as intended in the ear canal of the user. Thereby sound vibrations from the environment (and possibly from the output transducer) are directed towards the eardrum of the user. The output transducer may be constituted by or comprise a microphone and or a vibration sensor, e.g. an accelerometer, or a bone conduction microphone.

The hearing aid may comprise a user interface allowing remote control of functionality of the hearing aid, e.g. on/off, volume and program shift. The housing may comprise a wireless receiver forming part of the user interface.

The hearing aid may comprise a battery (e.g. a rechargeable battery), or other energizing means, for powering the components enclosed in the housing. The battery (or other energizing means) may be located in the housing.

Figure 8:
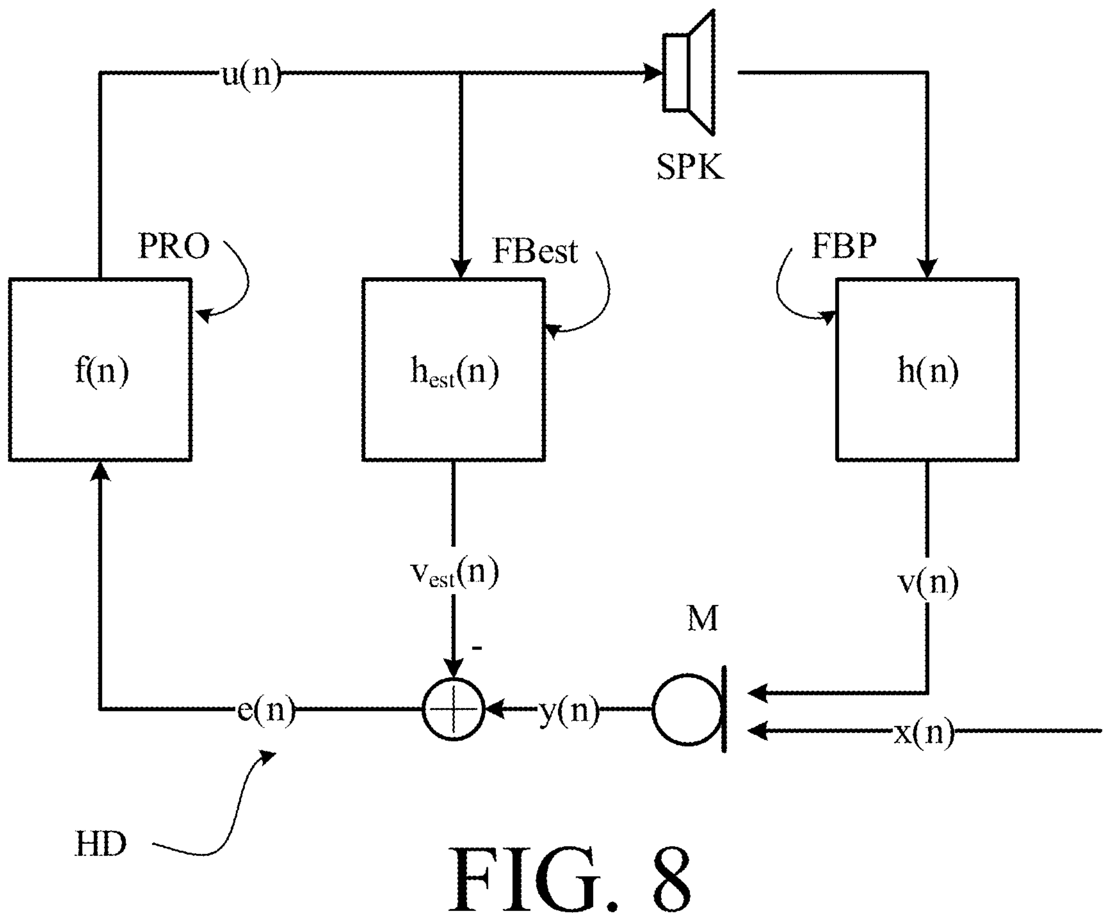
FIG. 8 shows a schematic drawing of an exemplary feedback cancellation system of a hearing aid.

As illustrated in FIG. 7, a hearing aid (HD, or the ITE-part of the hearing aid) according to the present disclosure comprises a forward path for processing an audio signal. The forward path may comprise a) an input transducer (M, e.g. a microphone) for picking up sound ($S_{env}+S_{HD}$) in the ear canal (ear canal) and providing an electric input signal representing said sound, b) a signal processor (Amplifier) for processing (e.g. amplifying or attenuating) said electric input signal (or a signal originating therefrom) and providing a processed signal, and c) an output transducer (SPK, e.g. a loudspeaker) configured to convert the processed signal to output sound ($S_{HD}$) in dependence of said electric input signal. The hearing aid (or the ITE-part of the hearing aid) further comprises a feedback control system for estimating and cancelling (or reducing) signal components in a signal of the forward path originating from a feedback path from the output transducer to the input transducer (cf. FIG. 8).

The mechanical setup of the hearing instrument is of course very prone to feedback, so this invention is dependent on a feedback canceller (see FIG. 7, 8):

1. The microphone signal y(n) represents the sound that the user experiences at the tympanic membrane (Eardrum). This signal is very useful to have access to, since it represents what the user potentially hears directly, including what amount of comb filter effect is present, what the final sound pressure level is at the tympanic membrane, and so on. That is why this microphone is also called a monitor microphone.
2. The microphone signal y(n) is the sum of two separate components, the direct sound ($S_{env}$) represented by x(n) in FIG. 8 and the feedback sound ($S_{HD}$) represented by signal from the receiver v(n) in FIG. 8. The feedback canceller (comprising feedback estimator $FB_{est}$ and sum unit '+') subtracts the feedback estimate $v_{est}(n)$ from the electric input signal (microphone signal y(n)) such that only the direct sound x(n) remains (in the ideal case where $v_{est}(n)=v(n)$), which is used as input to the signal processor (PRO) for applying one or more processing algorithms to the feedback corrected input signal e(n) (output of sum unit ('+'). The one or more algorithm may e.g. include noise reduction, hearing loss compensation, etc. The level difference between this direct sound signal x(n) and the microphone signal y(n) may represent the effective amplification that the user receives.
3. The feedback canceller derives the feedback signal $v_{est}(n)$ from the hearing instrument output signal u(n) by applying the estimated feedback path $h_{est}(n)$ (impulse response, or transfer function). This estimated feedback path is, in the ideal case, equal to the feedback path h(n), which has two components:
   a. The transfer function of the receiver (SPK): Certain changes in h(n) could indicate, for example, a malfunctioning receiver.
   b. The in-ear transfer function from the receiver (SPK) to the microphone (M), which is defined by the acoustics of the ear canal: Certain changes in h(n) could e.g. indicate that the user occludes the ear canal with a finger. This can be used as a means to interact with the instrument (turn it off, change the program, etc.).

As described in point 2 above, the effective amplification at the user's ear can estimated by calculating the level difference between the signals x(n) and y(n). And as both the direct sound x(n) and the amplified sound y(n) are measured with the same microphone, any hardware tolerance of that microphone is subtracted out when calculating the effective amplification.

The difference between the effective amplification and a given target amplification can then determined in order to adjust the Hearing Instrument amplification f(n) accordingly and to finally converge to the target amplification.

The hearing device that can thus accurately measure the effective amplification provided to the user. This information can be used in two different ways: 1) adjust the instrument gain during wearing time in order to converge to the desired target amplification, or 2) log the difference between the effective and the desired target amplification over time and provide a suggested gain adjustment to a Hearing Care Professional (HCP) or directly to the user.

Further, the tympanic membrane signal may be used as input signal for the HI. The tympanic membrane signal can be captured by a monitor microphone as described above, but also other techniques might be used. Examples of such other techniques are: a laser vibrometer, capacitive sensors, a measurement device directly coupled to the tympanic membrane or the middle ear ossicles. The amplified sound is then also applied to the tympanic membrane by means of a traditional receiver (over the air) or by any other means like actuators mounted directly on the membrane or the ossicles.

A difference of this idea over previous solutions is that it requires strong acoustic feedback in order to work. The direct sound and the amplified sound have to add up at the microphone so that we can estimate the effective amplification. In other words, the ear canal has to be as open as possible in contrast to other IIC solutions where the canal is substantially sealed.

Further, this monitoring works using only one single microphone. Other monitor microphone solutions have been proposed before, but the monitor microphone is normally used just for monitoring, not as the primary input source to the hearing aid.

A hearing instrument with the described hardware characteristics has a number of other potential benefits.

Truly invisible, i.e. it cannot be seen externally.

No wind noise.

Preservation of the natural cues from the Pinna AND the external ear canal resonance.

When turned off, it is just as if you had no hearing aid on, i.e. it does not occlude the ear canal.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element but an intervening element may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method is not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

REFERENCES

EP3291581A2 (Oticon) Jul. 3, 2018

The invention claimed is:

1. A method of detecting a sudden change in a feedback/echo path of a hearing aid comprising:

S1. estimating a feedback path using an adaptive algorithm employed by an adaptive filter to detect the sudden change in the feedback/echo path;

S2. smoothing a gradient of the adaptive algorithm over time;

S3. performing an operation on the smoothed gradient to provide a modified gradient;

S4. determining whether the gradient or the modified gradient fulfils an instability criterion; and S5. detecting the sudden change in the feedback/echo path as a result of the instability criterion being fulfilled.

2. A method according to claim 1, further comprising: comparing a smoothed and processed version of gradient values of the adaptive algorithm over time to a threshold value.

3. A method according to claim 1, further comprising in response to the instability criterion being fulfilled, updating the adaptive feedback path estimate of the adaptive algorithm and/or adapting another processing of the hearing aid when.

4. A method according to claim 3, wherein said another processing of the hearing aid comprises detecting directionality.

5. A method according to claim 1, wherein the instability criterion is fulfilled when the one or more gradient values, or modified gradient values, or a weighted combination of said one or more gradient values, or modified gradient values, are larger than a threshold value.

6. A method according to claim 1, further comprising: repeating steps S1-S4 when the instability criterion is not fulfilled.

7. A method according to claim 1, further comprising determining a feedback path change from the gradient, or the smoothed or modified gradient, when the instability criterion is fulfilled.

8. A method according to claim 1, wherein step S2 comprises smoothing a gradient vector g (n) of adaptive filter coefficients over time, where n is a time index, by using a first-order filter with a coefficient a, wherein the smoothing of the gradient vector g(n) is performed according to the following formula:

$$g_{sm}(n)=a*g(n)+(1-a)*g_{sm}(n-1),$$

where a is a small and positive number, and where the elements of the gradient vector g (n) are constituted by the gradients to adapt the respective filter coefficients of the adaptive filter from one time step to the next.

9. A method according to claim 8 wherein step S3 comprises performing operations (O) on the vector entries of the smoothed gradient vector $g_{sm}(n)$ to obtain an operations vector $g_O(n)$ as follows:

$$g_O(n)=O(g_{sm}(n)),$$

wherein the operations (O) comprise one or more of min, max, median, sum, mean, and abs.

10. A method according to claim 9, wherein step S4 comprises performing a comparison of the operations vector $g_O(n)$ with a feedback criterion comprising a threshold value (THV) to determine a feedback/echo path change, $$g_O(n)>THV?$$

wherein the threshold value may be a single value, or a threshold vector.

11. A method according to claim 10, wherein the feedback/echo path change is determined as $g_O(n)>THV$ in step S4.

12. A method according to claim 1, further comprising taking a first action when the feedback criterion is fulfilled, and taking a second action or no action when the feedback criterion is not fulfilled.

13. A method according to claim 12, wherein a first action comprises initiating a change of the feedback/echo path estimate, or changing an adaptation rate of the adaptive algorithm, or changing a mode of operation of the hearing aid.

14. A method according to claim 1, further comprising determining current gradient values of the adaptive algorithm to adapt one or more of current filter coefficients of the adaptive filter and to provide smoothed and possibly further processed, versions thereof.

15. A hearing aid comprising:

an adaptive filter employing an adaptive algorithm to detect the sudden change in the feedback/echo path; and a controller configured to detect a sudden change in a feedback/echo path of the hearing aid by executing a process including S1. estimating a feedback path using an adaptive algorithm employed by an adaptive filter to detect a sudden change in the feedback/echo path;

S2. smoothing a gradient of the adaptive algorithm over time;

S3. performing an operation on the smoothed gradient to provide a modified gradient;

S4. determining whether the gradient or the modified gradient fulfils an instability criterion; and S5. detecting the sudden change in the feedback/echo path as a result of the instability criterion being fulfilled.

* * * * *